Figure 1:
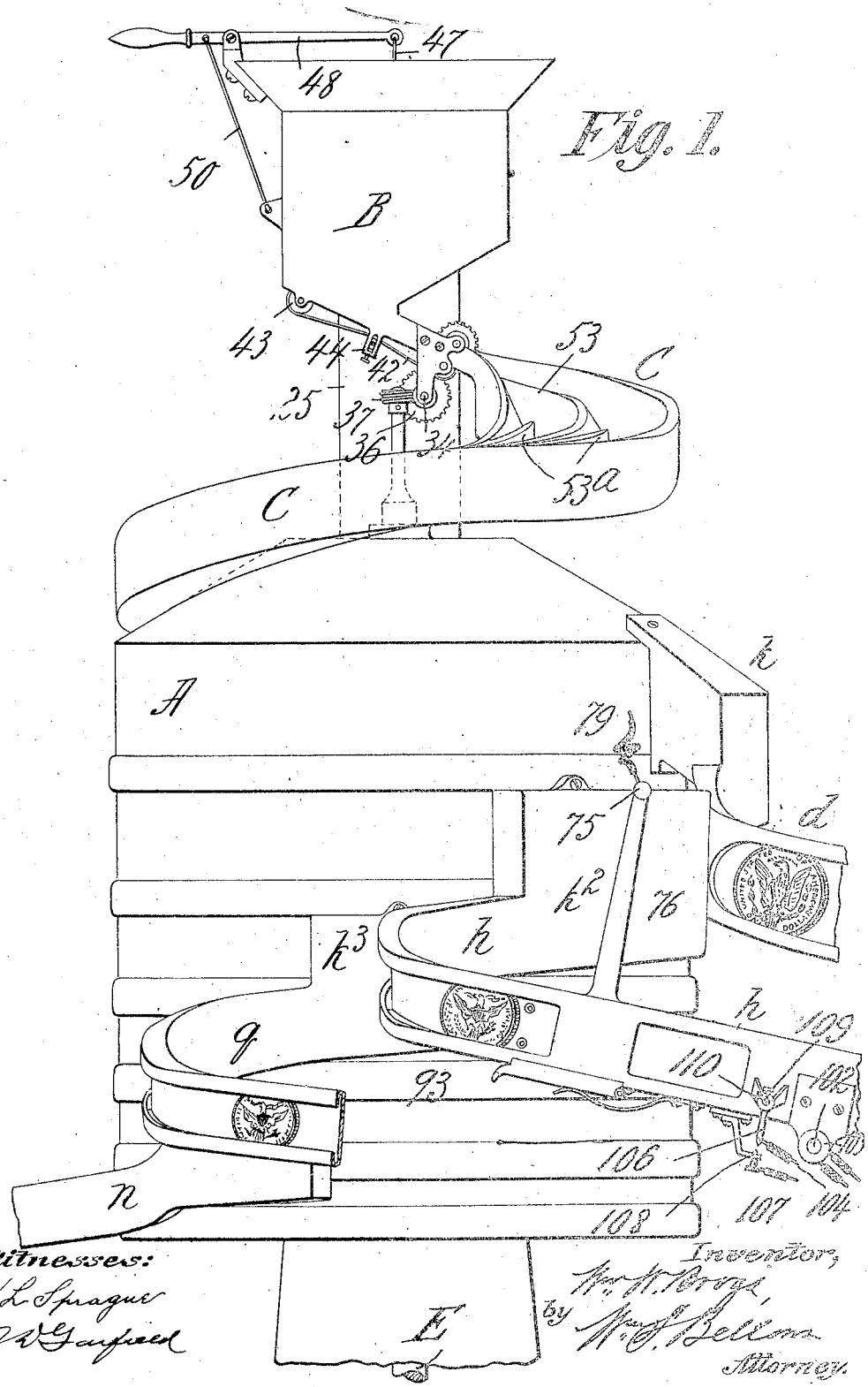

No. 857,786. PATENTED JUNE 25, 1907.
W. W. BROGA.
MACHINE FOR SEPARATING OR ASSORTING COINS.
APPLICATION FILED OCT. 31, 1904.

6 SHEETS—SHEET 1.

No. 857,786. PATENTED JUNE 25, 1907.
W. W. BROGA.
MACHINE FOR SEPARATING OR ASSORTING COINS.
APPLICATION FILED OCT. 31, 1904.
6 SHEETS—SHEET 2.
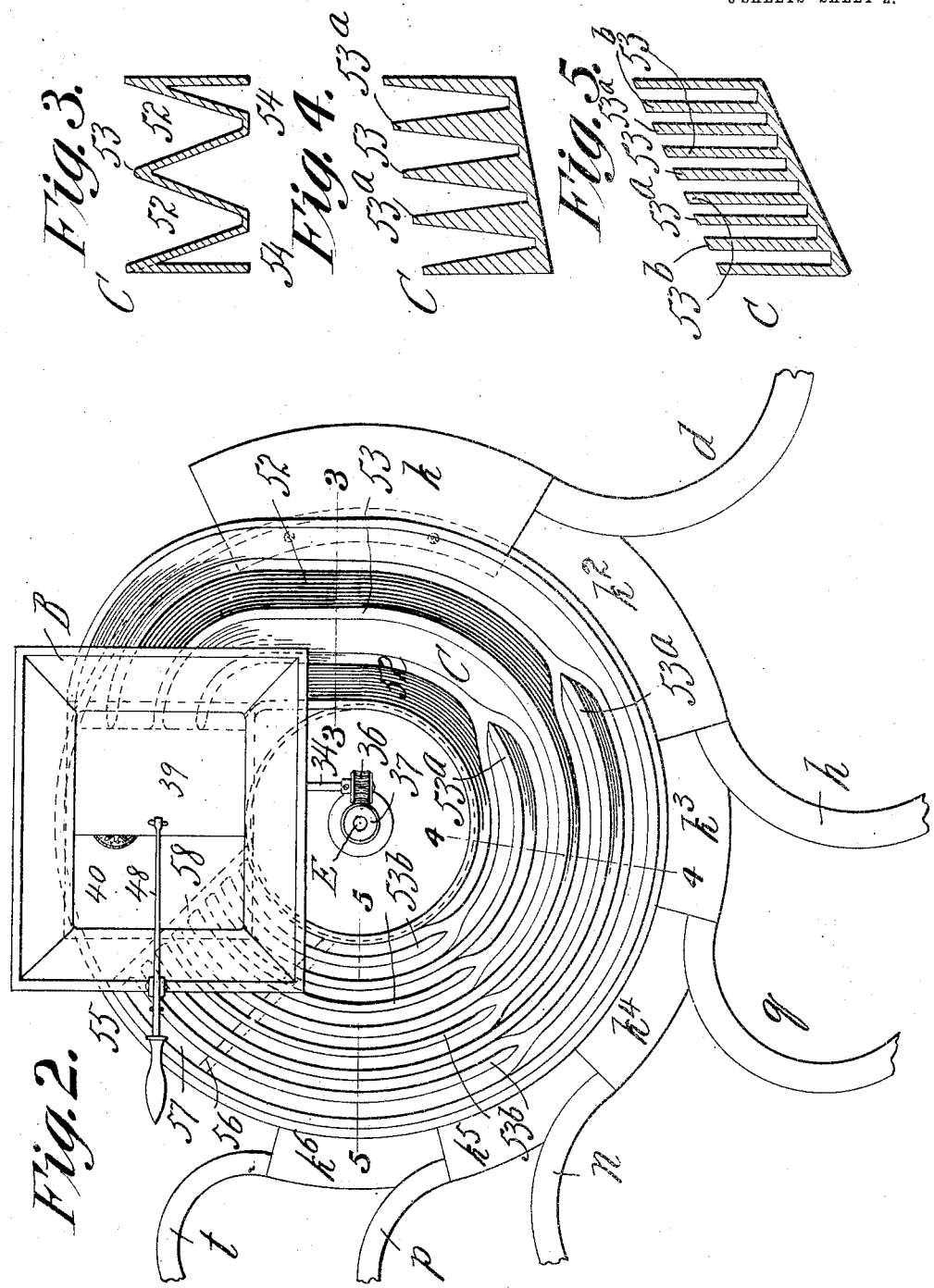

No. 857,786. PATENTED JUNE 25, 1907.
W. W. BROGA.
MACHINE FOR SEPARATING OR ASSORTING COINS.
APPLICATION FILED OCT. 31, 1904.
6 SHEETS—SHEET 3.
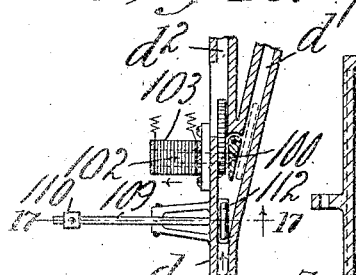
Fig. 16.
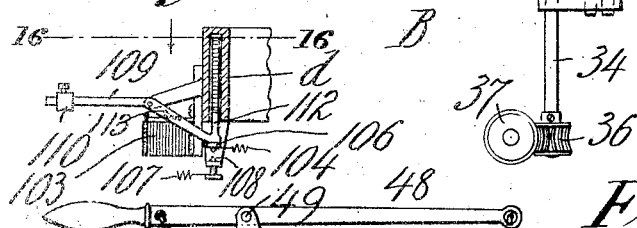
Fig. 6.
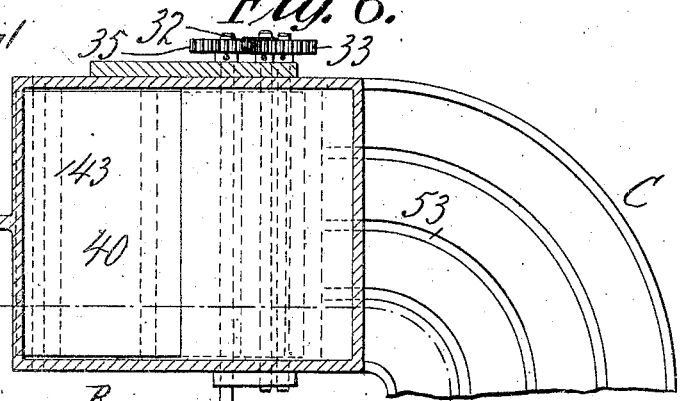
Fig. 7. Fig. 18.
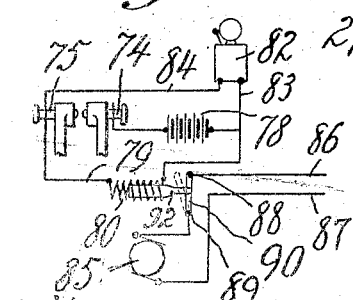
Fig. 17.
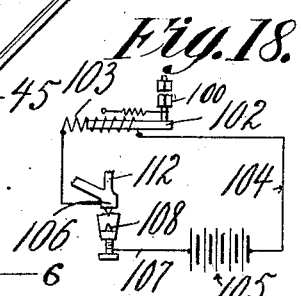
Fig. 18ᵃ
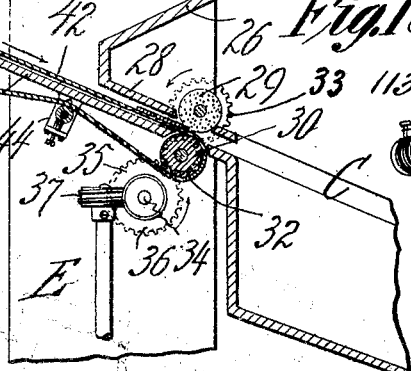
Fig. 15.
Witnesses:
Inventor,
Wm. W. Broga,
by _____, Attorney

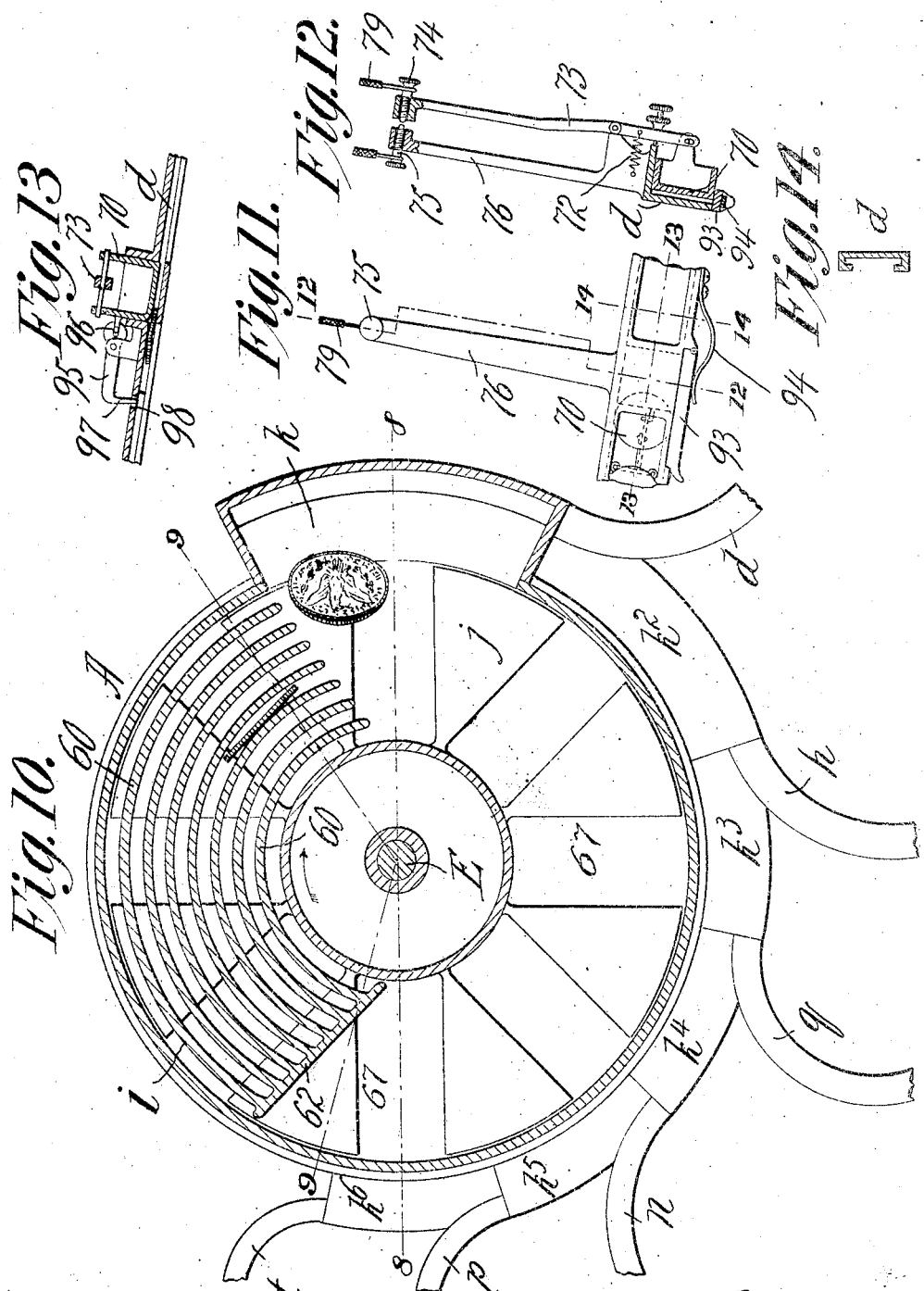

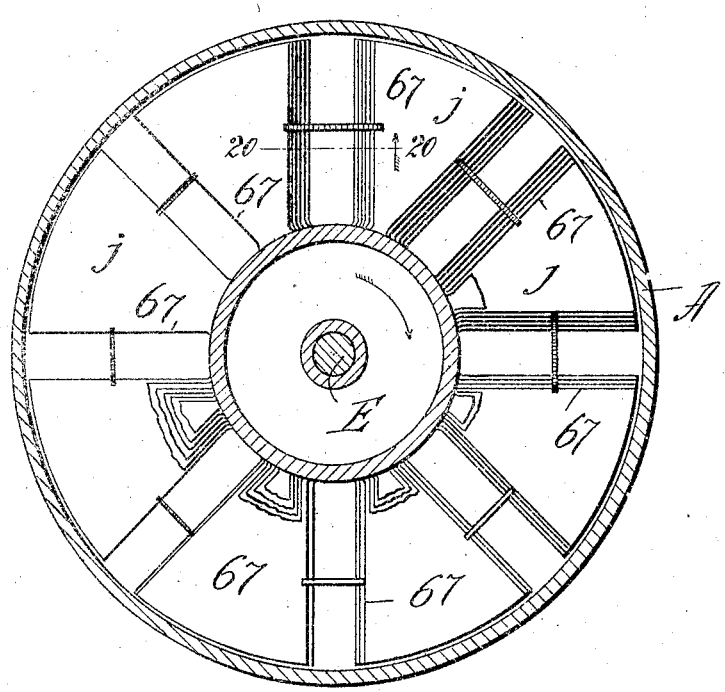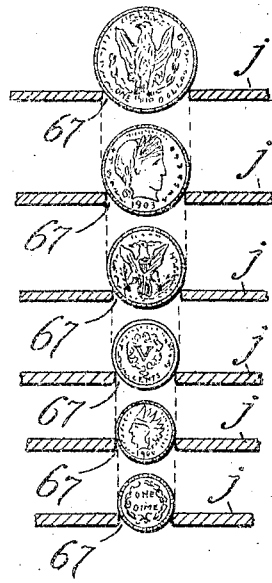

UNITED STATES PATENT OFFICE.

WILLIAM W. BROGA, OF SPRINGFIELD, MASSACHUSETTS.

MACHINE FOR SEPARATING OR ASSORTING COINS.

No. 857,786.     Specification of Letters Patent.     Patented June 25, 1907.

Application filed October 31, 1904. Serial No. 230,832.

*To all whom it may concern:*

Be it known that I, WILLIAM W. BROGA, a citizen of the United States of America, and a resident of Springfield, in the county of Hampden and State of Massachusetts, have invented certain new and useful Improvements in Machines for Separating or Assorting Coins, of which the following is a full, clear, and exact description.

This invention relates to an improved machine for causing a separation of coins of different denominations and of correspondingly different sizes, which are promiscuously placed in a receiver or hopper, and for delivering from the separating mechanism the assorted coins of given sizes and of the same denominations, into, and through, respectively provided chutes or conductors therefor.

An object of the invention is to improve and simplify the construction of the coin assorting or separating mechanism and to render the same susceptible of very rapid and certain operation.

Another object of the invention is to provide, in combination with the coin separating mechanism, means for feeding the coins from the receiver rapidly to such separating mechanism, and with little or no liability of having two coins facewise adhering one to the other passing along together.

Another object of the invention is to provide, in combination with the coin separating mechanism and between it and the hopper or coin receiver, means for causing all of the coins fed with their faces uppermost out from the receiver to assume positions to enter the separator with their edges uppermost, and, preferably, in distributed relations for entrance into the separator.

Another object is to provide means operable in conjunction with the chutes or conductors for arresting the passage through the chute or conductor of the coins when a bent, distorted or unduly thickened coin is in transit in, and through, the chute together with provisions for the expulsion of such abnormally shaped coins.

Another object is to provide in the separator, in conjunction with the delivery chute for assorted coins of one size and denomination, means for diverting, for expulsion, the course of coins which are too light for bunching or for circulation. And the invention has other and minor objects which are found to be carried out in, and by, the constructions and mechanisms hereinafter described.

The invention consists in coöperative combinations and arrangements of mechanical means, and the constructions of certain of the means and devices all substantially as hereinafter fully described and set forth in the claims.

Figure 8:
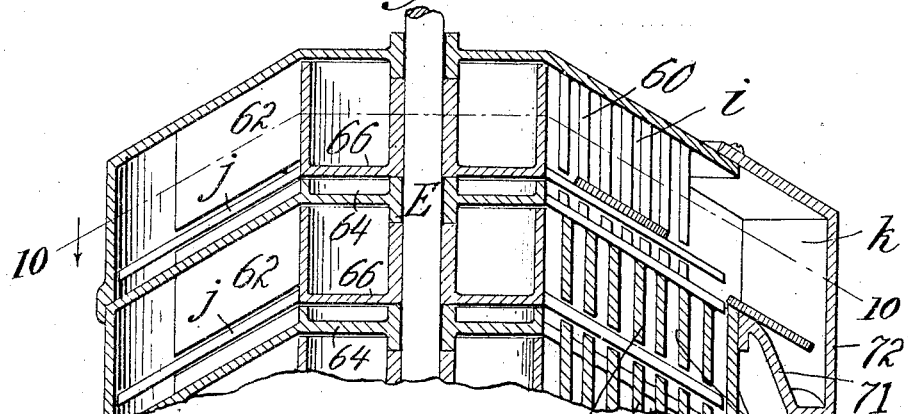
Figure 9:
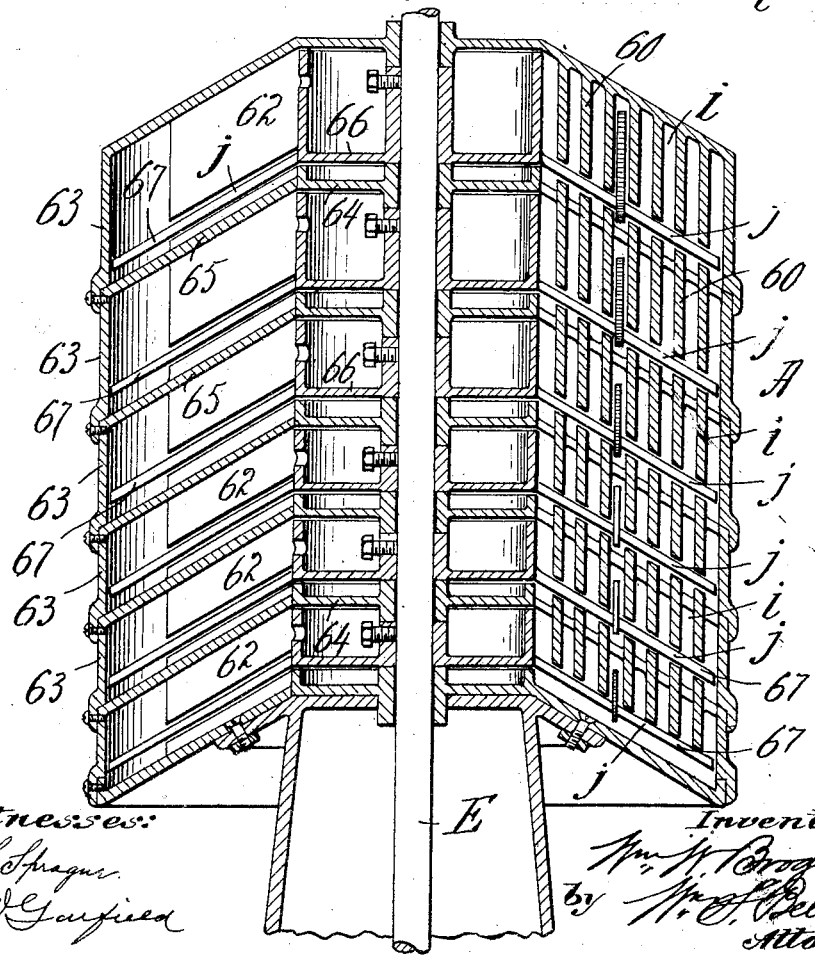

The improved coin separating or assorting mechanism is illustrated in the accompanying drawings, in which Figure 1 shows the same in elevation. Fig. 2 is a plan view. Figs. 3, 4 and 5 are cross sectional views through different portions of the coin guides between the receiver and the separator, and as taken respectively on the lines 3 3, 4 4, and 5 5, Fig. 2. Fig. 6 is a horizontal sectional view as taken horizontally through the lower portion of the hopper or receiver. Fig. 7 is a vertical sectional view through the receiver as taken on the line 7 7, Fig. 6. The line 6 6 on Fig. 7 shows the plane of section on which the preceding figure is drawn. Fig. 8 is a vertical sectional view through an upper part of the separator as taken on the line 8 8 on the plan and horizontal section 10 10, described below. Fig. 9 is a central vertical section through the separator as taken on line 9 9, Fig. 10. And Fig. 10 is a horizontal section as taken on the line 10 10, Fig. 8, showing in plan view the parts which appear below said plane of section. Fig. 11 is a side view of part of one of the delivery chutes showing the devices for arresting the passage of coins imperfect in shape. Fig. 12 is a cross sectional view as taken on the line 12 12, Fig. 11. Fig. 13 is an approximately horizontal sectional view as taken on the line 13 13, Fig. 11. Fig. 14 is a cross sectional view as taken on the line 14 14, Fig. 11. Fig. 15 shows in diagram, electric means coacting with the devices represented in Figs. 11 to 14. Figs. 16 and 17 are cross sectional views showing the device for detecting and excluding light coins. Fig. 18 is a diagram of the light weight excluding device. Fig. 18ᵃ is a perspective view of a portion of such device. Fig. 19 is a plan representation of the rotary tables at different levels, and omitting the grating above each table for the purpose of representing graduating and successively narrowing apertures in the several tables. Fig. 20 is a sectional representation through apertures of the several apertured and rotary tables as taken across an apertured portion of each on the line 20 20, Fig. 19.

Similar characters of reference indicate corresponding parts in all of the views.

In the drawings A represents, generally, a separating mechanism to which the coins are conducted from the receiver or hopper B by way of the downwardly inclined conductor C, with the result that the coins pour promiscuously into the receiver, and mechanically fed therefrom with their faces uppermost to the conductor are, by the latter, caused to assume positions and in distributed relations with their edges uppermost, and to so descend to be separated into the separator. And $d$, $h$, $q$, $n$, $p$ and $t$ represent chutes in connection with the separator A and at respectively different heights for the conveyance of the coins, viz, as the machine is here presented, dollars, one-half dollars, quarter-dollars, nickels, pennies and dimes, the enumeration being in succession corresponding with the graduate sizes of the coins.

The separating mechanism, which will be hereinafter described in detail, is inclosed within the cylindrical casing, having a frusto conical top and reëntrant base, and on a pillar or bracket 25, rising above the separator casing and to one side of its center, is the receiver B, which is made in the form of an upwardly open hopper having downwardly inclined bottom walls 26 and 27, with the downwardly inclining delivery passage 28 near the mouth of which is the pair of feed rolls 29 and 30, illustrated as in an arrangement to have different surface speeds as by the spur gear 32 for the roll 30 meshing into the somewhat larger spur gear 33 connected with the roll 29 so that there will be an action in case of coins coming together, or facewise stuck, between the outfeeding rolls, to slip one along ahead of the other.

The gear connected feed rolls are driven at a comparatively slow, and yet sufficient, speed through means of the horizontal shaft 34, having at one end the gear wheel in mesh with the feed roll gear 32, and having at its other end the worm wheel 36 with which the worm 37, at the upper end of the shaft E, engages. Said shaft E is the main shaft of the apparatus, and through means of which all of the movable parts are driven; and power may be applied to this shaft from any suitable source, as, for instance, by having it in direct or remote connection with an electric motor.

Within the receiver, between its open top and its downwardly inclined bottom, are deflectors 39 and 40, downwardly inclined,— the upper one 39 serving to guide the coins onto the one 40, and the one 40 serving to guide the coins onto the downwardly and rearwardly inclined receiver bottom 26, while such bottom guides the coins onto the bottom wall 27 which is in continuation, and forms a part, of the lower boundary 27 of the outlet passage 28. As an additional advantageous provision a wide endless belt or apron 42 moves over the bottom 27 and within the lower portion of the outlet passage 28,—this apron running around the lower feed roll 30, and an idler roller 43 and derives its progressive movement from its frictional contact with the said feed roller.

44 represents a tightener for the apron. The aforementioned deflectors 39 and 40 are represented as pivotally connected at 45 45 to the receiver and are, by the link 46, connected one to the other, and the upper one by the rod 47 has connection with the lever 48 pivoted at 49 at the rear of the receiver, and which lever has the stay rod 50 for keeping it immovable. By disconnecting the stay rod, the lever may be swung and the deflectors agitated to insure that none of the coins may fail to descend down onto the apron to be outfed to the conductor C. The conductor C is shown as having a width about the same as that of the delivery orifice of the outfeeding passage 28, which is comparatively wide and of small height. This conductor has a formation at its portion in connection with the delivery end of the receiver cross sectionally, as represented in Fig. 3. That is, it comprises the two comparatively wide troughs 52, the inner boundaries of each constituting at their junction the mid rib 53, so that the coins coming into either of the troughs will topple to inclined positions, and have their lower edges on the narrow, flat base portion 54 of one or the other of these troughs, and in case the coins come onto the mid rib 53, they, never exactly balancing, will tip to one side or the other and fall into one of the said troughs. The coins coming into the troughs by reason of the spiral and downward formation thereof, will have a gravitative progression, and before having traveled through one-half the circular course, will have encountered the upwardly convergent ribs $53^a$ $53^a$, which subdivide the troughs; the two branching into four, as cross sectionally represented in Fig. 4, and the four troughs farther around the conductor have the mid ribs $53^b$, which further subdivide the conductor into a doubling number of upwardly open troughs, the latter, 8 in number, as shown in the cross section, Fig. 5, and in the plan Fig. 2, having widths somewhat greater than the thickness of a silver dollar, the trough openings, however, being of insufficient width to permit even the smaller coins, as pennies or dimes, from occupying anything but edgewise upward positions. And inasmuch as it is desirable to have the terminal 55 of the conductor C at its bottom adhering closely to the frusto conical top of the separator casing, the helical base of the conductor is made with a "wind" or, at least, it merges from the horizontal, as represented in Fig. 3, to a decided inclination, as represented in Fig. 5.

The terminal portion 55 of the conductor and the top wall of the separator casing may be considered as connected or integral structural parts, and the base of the conductor terminates on the line represented at 56 at the margin of the aperture 57 through the separator casing top, while the trough separating ribs 53, 53ª and 53ᵇ are continued to the vertical end wall 58 standing above the rear margin of the aforesaid aperture 57, which is the opening into the separator for the coins to pass, by dropping from any of the several trough ways of the conductor, more or less distributed by reason of their guidance in the different conductor troughs, and all with their faces substantially parallel.

The separator comprises a system or series of gratings $i$, the vertical aspect thereof being seen in Figs. 8 and 9, and the horizontal representation of one thereof being made in Fig. 10, each of the gratings being the counterpart of another and all adjusted so as to have positions one directly over another, with, however, a space between each grating and the one next thereunder, affording room for occupancy of the relatively intermediate rotary tables $j$. Each grating comprises a series of separated parallel edgewise upwardly and downwardly arc-shaped members 60 with the spaces between them of width about the same as the widths of the troughways at the terminal portion 55 of the conductor C. The gratings next to the ones thereabove are of successively decreased height, as represented in Fig. 9, and corresponding to the decreased diameters of the coins of different denominations. Each of the gratings has the rear wall 62 to prevent coins falling therewithin from having any motion otherwise than toward the right, as Fig. 10 is viewed. The next of the gratings opposite the walled ends 62 are open so that the coins may be carried out therefrom.

The gratings in the separator, as represented in Figs. 8 and 9, are made with the annular sections 63 63, which, stacked and secured together, constitute the inclosing casing A, the annular sections each comprise a concentric, hollow, hubbed portion 64, a connecting web 65 between the hubbed portion and the outer annular part 63, which intermediate portion is formed corresponding to the frustum of a cone; and is suitable apertured or cut away especially at the grate portion $j$ of the section, so as to leave the spaces between all of the bars and one grating downwardly open, and with the arc spaces of all the gratings directly under each other. The hubbed central portions of the integrally formed grating and casing sections are constructed with vertically alined holes, through all of which the shaft E loosely passes. And said shaft E loosely passes through the grating section hubs, and has secured thereto the hollow or cored out hubs 66, which carry the rotary apertured tables $j$, one of each closing under one of the grating sections. And said rotary tables, which would be seen in the form of an annulus as looking down thereupon, are inclined downwardly and outwardly, as will be perceived on reference to Figs. 8 and 9, conforming to the slant surface of a frustum of an oblated cone $j$.

The apertures in the rotary tables $j$ are represented at 67, and are radially arranged, and, as shown, open to the outer edges of the tables 67. The radiating apertures 67 of the upper rotary table $j$ have, each, a width slightly less than the diameter of a silver dollar, but greater than the diameter of one-half dollar, so that silver dollars coming within the arc barred grating onto such rotary table, will marginally engage in one or another of the apertured portions, and by the table be carried around out from the grating up from the open right hand end of the grating, whereupon it will fall onto its side, and, by reason of the inclination of the table, slide toward the table edge and off therefrom onto the chamber $k$, from which the chute $d$ for the dollars, is a continuing conduit.

The apertures in the second rotary table from the top have widths slightly less than the diameter of a half-dollar, but greater than the diameter of a quarter-dollar; the apertures in the third table permit nickels to pass therethrough but are to intercept the quarters; the apertures in the fourth table are sized to intercept nickels, permitting pennies to pass therethrough, while the apertures in the fifth table permit the smallest coins, dimes, to pass therethrough, but intercept the pennies.

It is immaterial whether or not the last and lowest rotary table of the series be apertured for any passage of coins therethrough, excepting in so far as the provision of the apertures afford means for the engagement marginally of the coins led down through the grating thereunto, to be moved around out from the open end of the grate by the table.

Chambers corresponding to the one $k$, respectively represented by $k^2$, $k^3$, $k^4$, $k^5$ and $k^6$, for the reception thereinto of the sorted out coins of the same denomination, are located at the heights of the respective tables and are continued in the downwardly inclined chutes or conductors $h$, $g$, $m$, $p$ and $t$, as represented in Figs. 1, 2 and 10. And, as represented in Fig. 8, each chamber opening through the casing section 63 for communication with the space in which the rotary table turns, has the inner lower wall, as represented at 71, downwardly and outwardly inclined to form with the outer wall 72 a trough opening, into which the facewise uppermost coins will be tipped edgewise uppermost to be continued therefrom through the chute $d$, which is cross-sectionally, for instance as represented in Fig. 14, with dimensions proportionate to the diameter and thickness of the coin, and for the free passage of the latter therethrough.

From the foregoing description, it is believed to be rendered plain that the action of the plurality of the apertured rotary tables, all moving in unison in conjunction with the series of gratings, open at top and bottom, and each open at one end and one of each having its location next above a table, will result in the thorough separation of the coins of the different sizes and the permission of the same to go to their respective chutes which conduct them, assorted in suitably radiating directions away from the machine, these chutes, as I contemplate, carrying the coins to, and subject to the action of counting and registering mechanism and to be subjected to the further action of mechanism for taking given numbers of the coins and bundling and wrapping the same. The counting and registering mechanism, and the bundling and wrapping mechanism, constitute the subject matters of two separate applications for Letters Patent of the United States to be filed about concurrently herewith.

Each of the carrying away chutes leading from the separating mechanism is equipped with a device operative in the presence in, and passage along, the chutes of distorted or bent coins or two unusually thin coins adhering facewise, to arrest the further passage of all following coins in the chute, to automatically stop the machine, and simultaneously sound an alarm so that the trouble giving coin or coins may be extracted for, then, the resumption of the proper actions of coin separation and delivery.

Referring to Figs. 11 to 15, the chute $d$ or $h$, $q$, $n$, $p$, or $t$, has, at any suitable place, a movable side constituted by a circular part, or feeler 70, movable in a circular opening therefor, and with its inner face normally in continuation of the natural wall of the chute. This feeler 70 is held to its proper normal and inwardly disposed position, separated from the opposite wall of the chute by a space slightly and properly greater than the thickness of the coins which are to pass through the given chute, by the spiral spring 72, which exerts its reaction against the pivot lever 73, which carries at its free end the insulated contact screw 74, which is adjacent and coöperates with the contact screw 75 on the bracket extension 76 of the chute.

The diagram, Fig. 15, shows the electrical arrangements combined with the contact 74 which is movably controlled by the aforementioned feeler 70. From the battery 78 the wire 79 runs to the contact 74 and from the adjacent contact 75, the wire 79 has ultimately return connections with the battery, it including intermediately the solenoid coil 80. Included in the circuit, to be closed by the contact 74, 75, is an electric bell 82, 83 and 84 being the wires therefor.

85 represents the electric motor understood as the motor in driving connection with the driving shaft E of the separating and distributing apparatus.

86 and 87 represent the line wires to, and returning from, the motor, the one 86 having the fixed separated contact points 88, and 89 with the switch 90 movable from its constant connection with the contact 89 to the opening and closing relation, as it is swung, to the contact 88. The movable core 92 of the solenoid 80 has actuating connection with the switch 90.

A bent coin coming, as represented in Fig. 13, to the place shown, crowds the feeler 70 outwardly, establishing the electric circuit for energizing the solenoid coil, which opens the power circuit for the motor, resulting in the stoppage of the machine and simultaneously therewith, also insuring the notification of the obstructing presence of the bent coin by the sounding of the electric bell. The chute has in its bottom, adjacent the feeler, an aperture large enough for the extraction of a distorted coin therethrough, such aperture being closed by a trap door section 93, which is held closed by the spring 94,—but so that the obstructing coin may be easily drawn out. It is also to be pointed out that the progress of coins in the chute will be automatically arrested so soon as the bent or two stuck-together coins come to the place to actuate the feeler.

95 represents a lever having the engagement at 96 with the feeler, and having the finger 97 adapted to protrude through the aperture 98 in the side wall of the chute; this lever being swung as the feeler is outwardly moved to position the finger 97 across the chute way. In each of the chutes is a detector device for insuring an exclusion of badly worn or otherwise unduly light coins, and for permitting the progression without interference in the proper course of the up-to-weight coins. This device is represented in Fig's. 16 to 19. In the first of these figures the chute, for instance one $d$, is shown with the continuing portion $d^1$, through which the proper coins are to go and with the branchway $d^2$, through which the coins of insufficient weight are to be diverted.

100 represents a switch tongue at the junction of the chuteways $d^1$, $d^2$, in connection with the core 102 of the solenoid 103, which is comprised in the electric circuit, including the wire 104 from the battery 105 to the solenoid coil, and from the solenoid coil to the contact 106, and the wire 107 from the other contact 108 returning to the battery. The contact 106 is movable by reason of being carried by, or as a part of, the pivot lever 109 on the extension of which is the adjustable weight 110. The contact carrying lever 109 has a finger 112 projecting through an aperture in the bottom of the chute, which finger by every full weight coin, will be depressed against the counter weight at 110, to close the solenoid circuit and cause the solenoid core to have a throw to draw the switch tongue 100 to the relative position, represented in dotted lines Fig. 16, leaving the continuation $d^1$ of the chute free and open for the passage of the coin therethrough, and blocking the passage of the full weight coin through the chute way branch $d^2$. The normal position of the switch tongue will be across the entrance to the portion $d^1$ of the chute,—being held thereto and automatically returning thereto after each electric actuation by the passage of the full weight coin,—by the light spiral spring 113.

Under, and in accordance with, the substance of this invention, the improvements and means to the ends set forth to be accomplished may be carried out without departure from the principles hereof even in cases where considerable alteration is made in respect of details of construction, and the minor, and immaterial arrangements of some of the parts and devices.

While the machine illustrated and described in this case has capability for the assortment of the six most common coins in circulation, it is almost unnecessary to add in this connection that the machine may include arrangements for the assortment of more or less than the stated six denominations and sizes of coins, as particularly described; and it is only an extension of the idea of means covered herein to construct the assorting mechanism with capability of separating not only the common coins hereinabove enumerated, but also further coins of American circulation, such as twenty-cent pieces, silver half dimes, and three-cent pieces, and foreign coins.

Having thus described my invention, what I claim and desire to secure by Letters Patent is:

1. In a coin separating machine the combination with a coin receiving receptacle having a forwardly and downwardly inclined delivery passage and means in said receptacle, for discharging the coins therefrom facewise uppermost, and a conductor having its coin receiving portion adjacent and below the delivery passage of said receptacle, and comprising one or more troughs having inclined sides whereby the coins coming facewise thereinto are caused to assume edgewise upward positions, and said troughs extending with a downward inclination from their coin receiving ends, of a separating mechanism to which the coins are guided by said inclined troughs, and for assorting the same in their respective sizes.

2. In a coin separating machine, the combination with a coin receiving receptacle having a downwardly inclined delivery opening through which the coins may be discharged facewise uppermost, a pair of feed rolls at such delivery opening arranged and operable to have different surface speeds, in rotation, and a conductor having its coin receiving portion adjacent and below the delivery passage leading from said receptacle and operable to cause the coins to assume edgewise upward positions, of a separating mechanism to which the coins are guided by said conductor and for assorting the same in their respective sizes.

3. In a coin separating machine, the combination with a coin receiving receptacle having a downwardly inclined bottom, and a wide delivery opening through which the coins may be discharged facewise uppermost, an endless apron at the bottom of the receptacle and having a portion or course thereof running above and adjacent the said inclined bottom, a pair of feed rolls located adjacent the mouth of said delivery passage, and means for rotating the rolls and imparting a progressive movement to the apron, and a conductor having its coin receiving portion adjacent, and below the delivery passage of, said receptacle, and comprising means for causing the coins, coming facewise thereinto, to assume edgewise upward positions, of a separating mechanism, to which the coins are guided by said conductor, and for assorting the same as to sizes corresponding to their respective denominations.

4. In a coin separating machine, the combination with a coin receiving receptacle having a wide delivery opening, through which the coins may be discharged facewise uppermost, an endless apron in the lower portion of the receptacle, and having a portion thereof running in said passage, a pair of feed rolls, located adjacent the mouth of said delivery passage, arranged for rotation with differing surface speeds, and means for rotating the rolls and imparting a progressive movement to the apron, a conductor having its coin receiving portion adjacent and below the delivery passage of said receptacle and operable to cause the coins to assume edgewise upward positions, of a separating mechanism to which the coins are conducted and for assorting the same as to sizes corresponding to their respective denominations.

5. In a coin separating machine, the combination with a coin receiving hopper, having a wide downwardly inclined passage, opening through its bottom and through which the coins may be discharged facewise uppermost, and pivoted deflectors in the hopper extending downwardly inclined from opposite sides thereof, and at different heights, together with means for imparting swinging movements to the deflectors, and a conductor leading from said receptacle and operable to cause the coins to assume edgewise upward positions, of a separating mechanism to which the coins are conducted and for assorting the same in their respective denominational sizes.

6. In a coin separating machine, the combination with a coin receiving hopper, having a wide downwardly inclined passage, opening through its bottom and through which the coins may be discharged facewise uppermost, and pivoted deflectors in the hopper extending downwardly inclined from opposite sides thereof, and at different heights, a link connecting one deflector with the other, the lever 48 and a connection between the lever and one of the deflector, of a conductor leading from said receptacle and operable to cause the coins to assume edgewise upward positions and a separating mechanism to which the coins are conducted and for assorting the same in their respective denominational sizes.

7. In a coin separating machine, the combination with a coin receiving hopper, having a wide downwardly inclined passage, opening through its bottom and through which the coins may be discharged facewise uppermost, the apron, and the delivery rolls coöperating as described at the passaged bottom of the hopper, and pivoted deflectors in the hopper extending downwardly inclined and from opposite sides thereof, and at different heights, a link connecting the deflectors and a lever connected to one of the deflectors, of a conductor leading from said receptacle and operable to cause the coins to assume edgewise upward positions, and a separating mechanism to which the coins are conducted and for assorting the same in their respective denominational sizes.

8. In a coin separating machine in combination a hopper having a downwardly inclined passage through its bottom, a pair of peripherally running rolls adjacent said passage, spur gears connecting said rolls and one of said rolls having an endless apron running therearound, which apron has a course thereof along the bottom of said passage, the shaft 34 having the gear wheel 35 in mesh with one of the roll gears and having the worm wheel 36, a conduit leading from the coin delivery passage of the hopper and coin assorting devices comprising arc-shaped gratings arranged in separation one above another, rotary tables having apertures under each grating, an opening leading to the uppermost grating, and to which said conduit leads and a rotary shaft to which the apertured tables are connected, provided with the worm 37 in mesh with the worm wheel 36.

9. In a coin separating apparatus in combination, a hopper or receiver for coins having a comparatively wide delivery passage through which the coins are discharged facewise uppermost, a conductor leading downwardly inclined from the delivery passage and having initially one or more widely open V-shaped troughs with intermediate trough separating ribs, and further upstanding ribs subdividing the troughs, and an assorting mechanism comprising a casing having a series of gratings therein and movable structures having apertures therein of graded sizes under the respective gratings and means for moving such structures, said casing having an opening through its top over the uppermost grating and to which opening the said conduit leads.

10. The combination with the receiving and coin delivering hopper and with the separating mechanism including a casing having an upwardly open aperture in its top, and located below the hopper, of a conduit C, leading in a spiral course from the hopper to the apertured top of the separating mechanism, and comprising initially one or more troughways and having in intermediate portions of the length thereof upstanding partitions dividing the initial troughways into a greater number of narrower troughways parallel with and each to the side of the other, for the purposes set forth.

11. The combination with a receptacle for the reception thereinto and the delivery therefrom of mixed coins, of a conduit leading from the receptacle and comprising a plurality of sidewise adjacent channels having inclined sides, and for causing the coins to assume edgewise upward positions, all of said channels having their terminals adjacent each other, an assorting device to which the coins are conveyed through said adjacently terminating channels, and comprising means for assorting the coins therein according to their sizes at different levels and chutes leading from the assorting device at different levels for conducting the coins of their respective denominations.

12. In a coin assorting mechanism, a plurality of endwise open gratings, one above another and in separated relations combined with a plurality of movable structures, one under each grating, and having apertures therethrough, those of a given structure being somewhat narrower than the apertures in the one next thereabove, and means for imparting the movements to said structures relatively to the gratings.

13. In a coin assorting mechanism, the combination with a cylindrical casing having an aperture in its top, of a series of arc-shaped gratings supported within the casing under said aperture, one above another, and in separation, a series of rotatable tables, one of each closely under a grating, and having apertures the widths of which successively decrease in respect of the tables at successively lower levels, and means for rotating the tables.

14. In a coin assorting mechanism, the combination with a cylindrical casing having an aperture in its top, of a series of arc-shaped gratings supported within the casing under said aperture, one above another, and in separation, and each having the one end wall 62, and all oppositely endwise open, a series of rotatable tables, one of each closely under a grating, and having apertures the widths of which successively decrease in respect of the tables at successively lower levels, and means for rotating the tables.

15. In a coin assorting mechanism, the combination with a cylindrical casing having an aperture in its top, of a series of arc-shaped gratings supported within the casing under said aperture, one above another, and in separation, and each at one end open between the grate bars thereof, a series of rotatable tables, having frusto conical tops and located respectively closely under the gratings, and having apertures, the widths of which successively decrease in respect of the tables at successively lower levels, means for rotating the tables, and means for conducting coins edgewise upward into the said aperture in the casing top.

16. In a coin assorting mechanism, the combination with a cylindrical casing having an aperture in its top, of a series of arc-shaped gratings supported within the casing under said aperture, one above another, and in separation, and all having the one end wall 62, and all oppositely endwise open, a series of rotatable tables, having their surfaces downwardly inclined, one of each closely under a grating, and having apertures the widths of which successively decrease in respect of the tables at successively lower levels, means for rotating the tables, and means for conducting coins edgewise upward to the casing aperture.

17. In a coin assorting mechanism, the combination with a cylindrical casing having an aperture in its top, of a series of arc-shaped gratings supported within the casing under said aperture, one above another, and in separation, and all having the spaces between the grate bars open at one end, a series of rotatable tables, having downwardly inclined tops and respectively located closely under the gratings, and having apertures, the widths of which successively decrease in respect of the tables at successively lower levels, means for rotating the tables, chambers communicating with the interior of the casing at different heights corresponding to the levels of the tables, and for the reception of the assorted coins.

18. In a coin assorting mechanism, the combination with a cylindrical casing having an aperture in its top, of a series of arc-shaped gratings supported within the casing under said aperture, one above another, and in separation, and all having the spaces between the grate bars open at one end, a series of rotatable tables, having downwardly inclined tops and respectively located closely under the gratings, and having apertures, the widths of which successively decrease in respect of the tables at successively lower levels, means for rotating the tables, chambers communicating with the interior of the casing at different heights corresponding to the levels of the tables, and for the reception of the assorted coins, and variably sized coin chutes in continuation of said chambers.

19. In a coin assorting mechanism, the combination with a cylindrical casing having an aperture in its top, of a series of arc-shaped gratings supported within the casing under said aperture, one above another, and in separation, and all having the spaces between the grate bars open at one end, a series of rotatable tables, having downwardly inclined tops and respectively located closely under the gratings, and having apertures, the widths of which successively decrease in respect of the tables at successively lower levels, means for rotating the tables, chambers communicating with the interior of the casing at different heights corresponding to the levels of the tables, and for the reception of the assorted coins, a receptacle for the promiscuous coins and from which they are discharged face upward, and a conduit for receiving the coins, up-edging the same and conducting them for entrance through the apertured top of the casing.

20. In a coin assorting mechanism, the combination with a cylindrical casing having an aperture in its top, of a series of arc-shaped gratings supported within the casing under said aperture, one above another, and in separation, and all having the spaces between the grate bars open at one end, a series of rotatable tables, having downwardly inclined tops and respectively located closely under the gratings, and having apertures, the widths of which successively decrease in respect of the tables at successively lower levels, means for rotating the tables, chambers communicating with the interior of the casing at different heights corresponding to the levels of the tables, and for the reception of the assorted coins, and having the lower portion trough shaped with an inward inclined side, and continued in a chute, for the purposes set forth.

21. In a coin assorting apparatus, in combination a casing, a series of gratings having the spaces between the bars thereof closed at one end and open at the other, and arranged one above the other in separation, a table, having apertures, under each grating, and means for imparting relative movements as between the tables and the gratings thereover, a conductor for bringing the coins edgewise upward into the spaces in the upper grating, and chambers, for the discharge thereinto of the assorted coins, connecting sidewise with the casing at different heights corresponding to the location of the tables.

22. In a coin assorting apparatus, in combination, a casing having a top aperture, a grating having the spaces between the bars thereof closed at one end and open at the other, a table, having apertures, under the grating, and means for imparting movement relatively between the table and the grating, a conductor for bringing the coins edgewise upward through the casing aperture into the spaces in the grating, and a sidewise located chamber for the discharge thereinto of the assorted coins.

23. In a coin assorting apparatus, in combination a casing having an apertured top, a series of gratings having the spaces between the bars thereof closed at one end and open at the other, and arranged one above the other in separation, a table having the surface thereof inclined and having apertures therethrough, under the respective gratings, means for imparting relative movements as between the tables and the gratings thereover, a conductor for bringing the coin edgewise upward into the spaces in the upper grating, and chambers for the discharge thereinto of the assorted coins, connecting sidewise with the casing at different heights corresponding to the locations of the tables.

24. In a coin assorting apparatus, in combination, a coin receiving and delivering hopper, and a conduit having branching troughways, for up-edging the coins and conducting them in distributed relations, a casing, having an opening thereinto, to which the conduit leads, a series of gratings in the casing, arranged one above the other in separation, tables having apertures respectively under the gratings, and means for causing movements of the coins for insuring the assorting thereof by the coöperative gratings and tables.

25. In a coin assorting apparatus, in combination, a coin receiving and delivering hopper, and a conduit having branching troughways, for up-edging the coins and conducting them in distributed relations, a casing, having an opening thereinto, to which the conduit leads, a series of gratings in the casing, arranged one above the other in separation, tables having apertures respectively under the gratings, means for causing movements of the coins for insuring the assorting thereof as subjected to the coaction of the gratings and tables, and discharge chutes in conjunction with each set of the gratings and tables for the outguiding of the graded coins.

26. In a coin assorting mechanism, a casing comprising the built up and united annular section 63, each having as an internal part thereof, a grating i of arc-shape having the wall 62 at one end, and with the spaces between the grate bars at its opposite end open, the central shaft extending through the casing and having a series of tables j with the apertures 67 of graded sizes therethrough and said casing having the aperture 57 through its top at a place over the vertically arranged series of gratings.

27. In a coin separating machine, the combination with an assorting mechanism and a chute for conducting the assorted coins of a given size, of a device automatically operable by the presence in the chute of a distorted coin to arrest the further passage of coins through the chute.

28. In a coin separating machine, the combination with an assorting mechanism, a motor for driving the movable parts of the same, and a chute for conducting the assorted coins of a given size away from the assorting mechanism, of a device automatically operable by the presence in the chute of a distorted coin to stop the driving motor for the coin assorting mechanism.

29. In a coin separating machine, the combination with an assorting mechanism and a chute for conducting therefrom the assorted coins of a given size, of a normally open electric circuit and an alarm device connected therein, and of a device automatically operable by the presence in the chute of a distorted coin, to close the electric circuit and actuate said alarm device.

30. In a coin separating machine, the combination with an assorting mechanism, and a chute for conducting therefrom the assorted coins of a given size, of a normally open electric circuit and an alarm device connected therein, and a device automatically operable by the presence in the chute of a distorted coin to arrest the further passage of coins, and to close the electric circuit to operate said alarm device.

31. In a coin separating machine, the combination with an assorting mechanism and a chute for conducting the assorted coins of a given size, of a device automatically operable by the presence in the chute of a distorted coin to arrest the further passage of coins in the chute, to energize an electro magnetic device controlling an electric motor, which is in driving connection with the coin assorting device.

32. A coin assorting mechanism comprising stationary and relatively movable parts, and an electric motor for the propulsion of the movable parts, a cut-out switch controlling said electric motor, in the line wire therefor, and a solenoid having the movable core thereof in connection with the said switch, of a chute leading from the assorting device and having at its side a movable feeler, a generator and circuit connections including said solenoid and having contacts, one of which is movably controlled by the actuation of the feeler for the purposes set forth.

33. A coin assorting mechanism comprising stationary and relatively movable parts, and an electric motor for the propulsion of the movable parts, a cut-out switch controlling said electric motor in the line wire therefor, and a solenoid having the movable core thereof in connection with said switch, a chute leading from the assorting device and having at its side a movable feeler, a generator and an electric alarm device and circuit connections including said solenoid and the alarm device and having contacts, one of which is movably controlled by the actuation of the feeler, for the purposes set forth.

34. In combination, a coin assorting mechanism, and a chute leading from the assorting device and having at its side a movable feeler, a battery, and an electric alarm device and circuit connections including the alarm device and having contacts, one of which is movably controlled by the actuation of the feeler, and an arrester movable across the chute way, and also controlled by the feeler.

35. The combination with a coin assorting mechanism of a chute for coins of uniform size having an apertured side and a feeler constituting a movable wall at such apertured side, a lever pivotally mounted adjacent the chute, having a finger adapted to be projected across the chute way and having an engagement with the feeler, to be actuated thereby.

36. The combination with a coin assorting mechanism, of a chute for coins of uniform size having an apertured side, and a feeler constituting a movable wall at such apertured side, a member 76 extended from the chute and carrying the electric circuit contact 75 and the intermediately pivoted lever 73 engaged with the feeler and carrying the electric circuit contact 74, as set forth.

37. The combination with a coin assorting mechanism, and a chute for coins of uniform size having an apertured side, the electric motor 85 for driving the assorting mechanism, in the line wire therefor, cut-out switch 90 controlling said electric motor, a solenoid 80 having the movable core 92 thereof in controlling connection with the switch, a feeler coacting with the chute way, the lever 73 controlled by the feeler and carrying the contact 74, a fixed contact 75 adjacent the one 74, a generator and circuit connections including the same, said contacts and the solenoid, for the purpose set forth.

38. The combination with a coin assorting mechanism, and a chute for coins of uniform size having an apertured side, the electric motor 85 for driving the assorting mechanism, the line wire therefor, the cut-out switch 90 for the wire, a solenoid 80 having the movable core 92 thereof in controlling connection with the switch, a feeler coacting with the chute way, the lever 73 controlled by the feeler and carrying the contact 74, a fixed contact 75 adjacent the one 74, an electric alarm device, a battery and circuit connections including the battery, said contacts, the alarm device and the solenoid, for the purposes set forth.

39. The combination with a coin assorting mechanism, and a chute for coins of uniform size, having an apertured side, the electric motor for driving the assorting mechanism, in the line wire therefor a cut-out switch 90, controlling said electric motor a solenoid having the movable core 92 thereof connected with the switch, a feeler provided at the chute way, the lever 73 controlled by the feeler and carrying the contact 74, the fixed contact 75, a battery and circuit connections including the same, said contacts and the solenoid, and the angular lever, pivotally mounted, engaged with the feeler, and having the finger 97 thereof arranged for projection across the chute way.

40. The combination with a coin assorting mechanism, of a coin conducting chute having an apertured side, and a feeler constituting a movable wall thereat,—and said chute having a coin extracting opening, a door 93 for closing said opening, and an arrester having a part arranged for projection across the chute way and operably engaged by the feeler.

41. The combination with an assorting mechanism, of a chute way for uniform sized coins having the aperture 98 through its wall and another aperture therethrough, and having an aperture for coin extraction through its bottom, the hinged door 93 at the bottom aperture having the closing spring 94 therefor, the angular lever 95 pivotally mounted at the side of the chute, and having the finger 97 for projection through the aperture 98, and the feeler arranged as described and having an operating engagement with the lever 95 substantially as described.

42. The combination with an assorting mechanism, and a chute having a continuation for proper, full weight, coins, and having a branching way for light weight coins, of a switch tongue movable at the junction of said ways, a device extending into the chute way and subject to actuation by the weight of the coin passing thereover and means operable by said device for shifting the switch, and directing the course of full weight and light weight coins.

43. The combination with an assorting mechanism, and a chute having a continuing way for proper, full weight, coins, and having a branching way for light weight coins, of a switch tongue movable at the junction of said ways, a device located at the bottom of the chute and extending thereinto and comprising a contact 106, another contact 108 beneath the one 106, an electro magnetic device operating the switch, a generator, and circuit connections including said contacts, the electro magnetic device, and said generator.

44. The combination with a coin assorting mechanism, and a chute having a way for proper, full weight, coins, and a way for light coins, of a switch tongue movable at the junction of said ways, a lever having an adjustable weight, pivotally mounted adjacent the chute, and having a finger projecting within the bottom of the chute, and a normally open electric circuit comprising a generator, an electro magnetic device controlling said switch and contacts, one of which is movable with said lever.

45. In a coin separating machine, the combination with an assorting mechanism, and a chute for conducting the assorted coins, of a device automatically operable by the passage of light weight coins to divert the course of such coins from the regular chute way and a device operable by the presence in the chute of distorted coins to arrest the further passage of coins through the chute.

46. The combination with the coin separating mechanism and a chute way, for uniform sized coins, leading downwardly inclined therefrom, and having a continuing way for full weight coins and a branching way for light coins, of a switch tongue 100 at the junction of the ways, a solenoid 103 having the core 102 engaging the switch tongue, the retracting spring 113 for the tongue, the pivotally mounted lever 109 having the adjustable weight 110 provided with the finger 112 extended within the chute bottom, and also having the contact 106, the contact 108 beneath the first contact, the generator and wiring connections from the generator to the solenoid, from the solenoid to the one contact, and from the other contact to the generator, substantially as and for the purpose set forth.

Signed by me at Springfield, Mass., in presence of two subscribing witnesses.

WILLIAM W. BROGA.

Witnesses:
  WM. F. BELLOWS,
  G. R. DRISCOLL.